United States Patent Office 2,983,620
Patented May 9, 1961

2,983,620

CLAY COMPOSITION OF IMPROVED HANDLING PROPERTIES

Edwin I. Haire, Dallas, Tex., assignor to Dow Corning Corporation, Midland, Mich., a corporation of Michigan No Drawing. Filed June 24, 1959, Ser. No. 822,434

4 Claims. (Cl. 106—71)

This invention relates to the art of the manufacture of brick and other fired clay products.

One of the perennial problems which has plagued the fired clay industry has been the lack of extrudability and moldability of certain types of clays which would otherwise be highly useful for the making of brick, tile and other ceramic articles. In general, this lack of extrudability can be overcome by increasing the water content of the clay. However, this introduces other problems. Because of the high water content the molded articles tend to shrink, warp or crack during the curing and/or firing process. Because of this the water content of the clay must be limited to that amount which gives a rigid, coherent molded article but which will not cause cracking or undue shrinkage or warping during the curing or firing process. If the extrudability of the clay can be improved without the addition of too much water, then these desirable clays can be employed in the manufacture of brick and other ceramic materials.

There are other types of clays which are suitable for extruding simple articles such as brick but which are not of sufficiently good extrudability for the manufacture of more complicated shapes such as partitioned tile and the like. It would be highly desirable to have an additive which would also improve the extrudability of this type of clay without the addition of more water.

As is well known, the water content of clay suitable for extruding the clay varies with each type. Thus the optimum amount of water must be determined for each clay.

It is an object of this invention to provide a method for improving the extrudability and workability of clay used in the manufacture of brick, tile and other fired clay products. Another object is to make possible the use of certain clays in the manufacture of fired clay products which have not heretofore been useable. Other objects and advantages will be apparent from the following description.

In accordance with this invention the manufacture of fired clay products is improved by adding to the clay prior to forming it into the desired shape, from .01 to 10% by weight, preferably from .01 to 1%, based on the weight of the clay of a water soluble alkali metal salt of a monovalent hydrocarbon substituted siliconate, in which salt there is an average of from .9 to 1.4 monovalent hydrocaron radicals per silicon atom.

The alkali metal siliconates employed in this invention are commercially available materials and well known in the art. In general, they are prepared by the reaction of alkali metal hydroxides with the corresponding hydrolyzable silanes or with the corresponding siloxanes. These alkali metal siliconates are generally complex materials having monovalent hydrocarbon radicals attached to some or all of the silicon atoms through silicon-carbon linkages. Specific examples of typical configurations of such siliconates are as follows: $RSi(OM)_3$, $RSi(OM)_2O_{.5}$, $RSi(OM)O$ and $R_2Si(OM)_xO_{2-x}$ in which R is a monovalent hydrocarbon radical, M is an alkali metal atom and $x$ has a value from .5 to 2. From the above formulas it is obvious that these siliconates can be monomeric materials or polymeric materials.

For the purpose of this invention the ratio of monovalent hydrocarbon radicals to silicon in the siliconates can range from .9 to 1.4. This means that the salts may contain silicon atoms having no substituent hydrocarbon groups (i.e. $SiO_2$ units) and that they may contain limited amounts of $R_2SiO$ units. Thus, the salts can be mixtures of various types of salts or they can be copolymeric materials having more than one type of siloxane unit. Ordinarily when the siliconates employed herein are polymeric materials the silicon atoms are connected through SiOSi linkages. However, if desired, some of the silicon atoms can be connected through SiSi linkages or SR'Si linkages in which R' is a divalent hydrocarbon radical such as methylene, ethylene, propylene, phenylene or butylene.

Salts which contain SiSi and SiR'Si linkages are obtained by reacting with alkali metal hydroxides the residue which remains after the distillation of methylchlorosilanes from the reaction product of methyl chloride and silicon. This residue is a complicated mixture of various chlorosilanes in which the silicon atoms are substituted with methyl, ethyl, propyl and butyl radicals and in which some of the silicon atoms are connected with methylene, ethylene, propylene or butylene radicals and in which some of the silicon atoms are attached directly to other silicon atoms. The reaction of methyl chloride with silicon is the primary commercial method of preparing methylchlorosilanes.

For the purpose of this invention the alkali metal siliconates should be water soluble in order to facilitate their mixing with the clay and in order to make the process more economical. The hydrocarbon radicals attached to the silicon can be any monovalent hydrocarbon radical such as alkyl radicals such as ethyl, methyl, propyl and butyl; alkenyl radicals such as vinyl, allyl and hexenyl; aromatic hydrocarbon radicals such as phenyl and tolyl; and alkaryl hydrocarbon radicals such as benzyl.

The salts of this invention can contain any alkali metal such as lithium, sodium, potassium and caesium.

The alkali metal siliconate can be mixed with the clay in any suitable manner. The preferred manner is to dilute the siliconate with water to give a dilute solution of the salt, that is 10% or less by weight, and to add this solution to the clay by any suitable mixing technique prior to molding or extrusion. In carrying out this procedure care should be taken so that the amount of water added to the clay is insufficient to cause it to shrink, crack or wrap during curing or firing.

When the clay has been mixed with the siliconate it is then far more extrudable than when the siliconate is absent. Thus clays which could not heretofore be extruded or formed into the desired shapes can now be so extruded without the addition of an objectionable amount of water.

The following example is illustrative only and should not be construed as limiting the invention which is properly delineated in the appended claims.

Example

The following alkali metal siliconates give superior extrudability when mixed with clay for making brick in the amounts specified below.

| Amount in percent by weight of clay | Siliconate |
|---|---|
| 1.0 | $[CH_3Si(ONa)O]_x$. |
| 0.05 | A siliconate made by reacting the residue of the reaction product of methyl chloride with silicon, with potassium hydroxide, which siliconate is characterized as follows: There was a total of 1.2 methyl, ethyl, propyl and butyl radicals per silicon. There is an average of 2 potassium atoms per silicon. A major proportion of the silicon atoms were linked through SiOSi linkages and a minor proportion were linked through SiSi and SiR'Si linkages where R' is methylene, ethylene and propylene. |
| 5.0 | $C_3H_7Si(OCs)_3$. |
| 0.05 | A mixture of 75% by weight $CH_3Si(ONa)_{1.5}O_{.75}$ and 25% by weight $NaO\left[SiO\begin{matrix}(CH_3)_2\end{matrix}\right]_2Na$. |
| 0.5 | $CH_2=CHSi(ONa)_2O_{.5}$. |
| 0.1 | $C_2H_5Si(OLi)_3$. |

That which is claimed is:

1. In the process of making fired clay products the improvement comprising adding to the clay prior to forming it into the desired shape, from .01 to 10% by weight based on the weight of the clay of a water soluble alkali metal salt of a monovalent hydrocarbon substituted siliconate in which there is an average of from .9 to 1.4 monovalent hydrocarbon radicals per silicon atom.

2. A process in accordance with claim 1 in which the monovalent hydrocarbon radicals are methyl.

3. As a composition of matter clay consisting essentially of from .01 to 10% by weight based on the weight of the clay of a water soluble alkali metal salt of a monovalent hydrocarbon substituted siliconate in which there is an average of from .9 to 1.4 monovalent hydrocarbon radicals per silicon atom.

4. A composition in accordance with claim 3 in which the monovalent hydrocarbon radicals are methyl.

References Cited in the file of this patent

UNITED STATES PATENTS 2,641,044    Bearer    June 9, 1953